Jan. 12, 1954

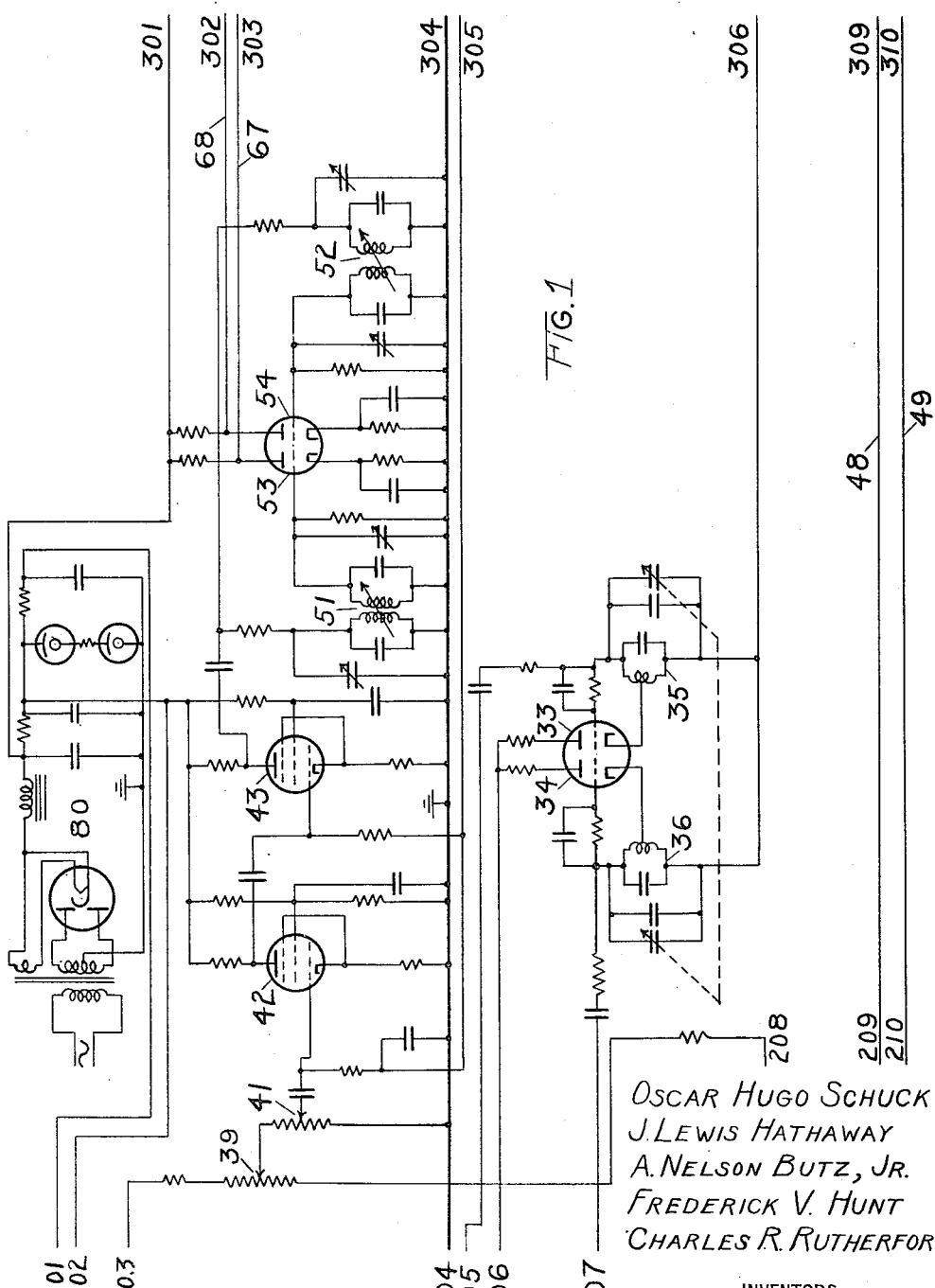

F. V. HUNT ET AL 2,666,192

APPARATUS FOR DETERMINING THE DIRECTION
OF UNDERWATER TARGETS

Filed July 27, 1944

OSCAR HUGO SCHUCK
J. LEWIS HATHAWAY
A. NELSON BUTZ, JR.
FREDERICK V. HUNT
CHARLES R. RUTHERFORD
INVENTORS

BY
ATTORNEY

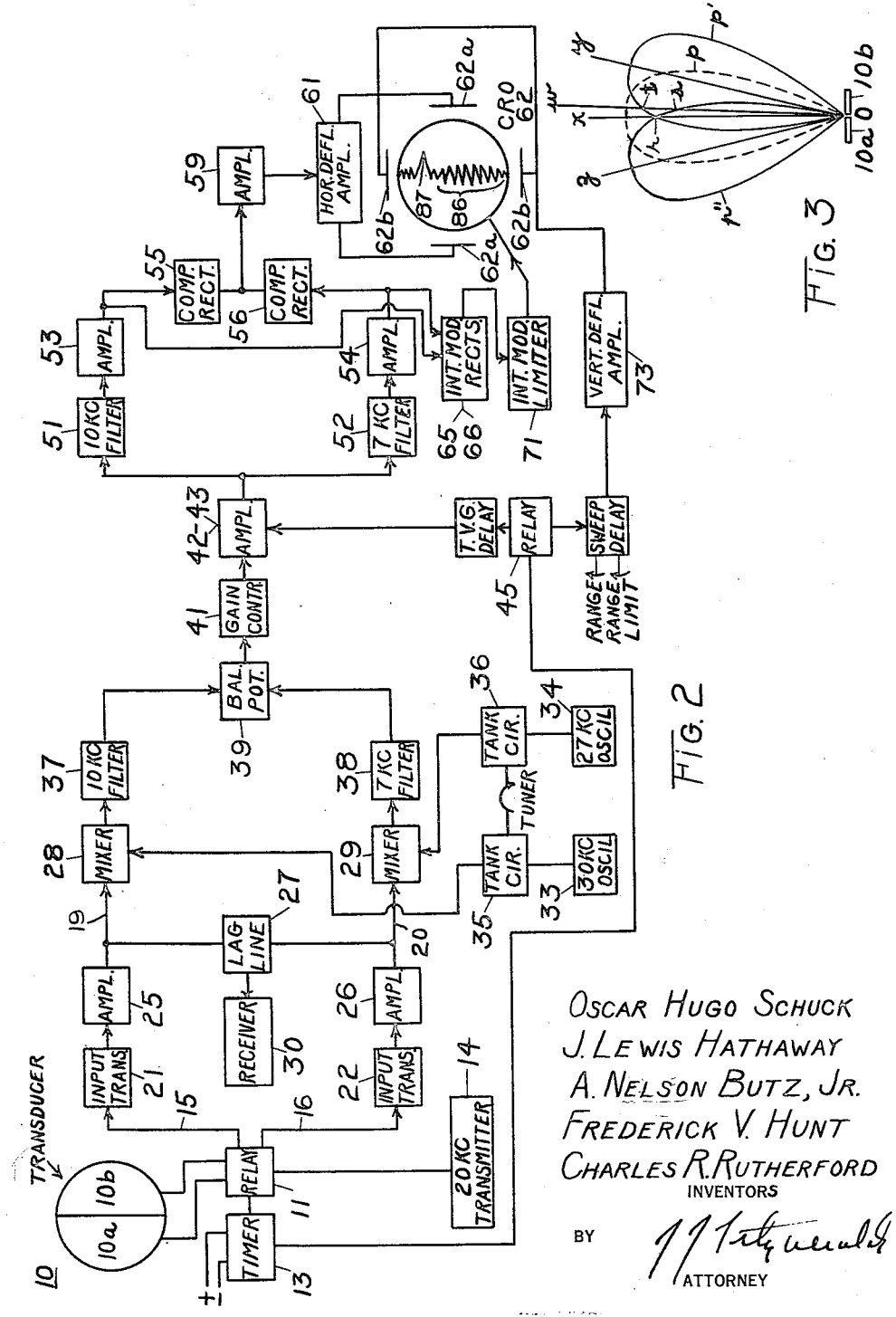

Patented Jan. 12, 1954

2,666,192

UNITED STATES PATENT OFFICE 2,666,192

APPARATUS FOR DETERMINING THE DIRECTION OF UNDERWATER TARGETS

Frederick V. Hunt and Oscar Hugo Schuck, Belmont, and Charles R. Rutherford and Jarrett Lewis Hathaway, Cambridge, Mass., and Arthur Nelson Butz, Jr., Maplewood, N. J.

Application July 27, 1944, Serial No. 546,842

32 Claims. (Cl. 340—6)

This invention relates to underwater target detection apparatus and in particular to a novel and improved device which is peculiarly adapted for use in conjunction with conventional underwater echo ranging equipment in order to provide an operator with more accurate information regarding the bearing of the target.

In conventional underwater echo ranging equipment, intermittent pulses of compressional wave energy, usually of supersonic frequency, are projected from a transducer, preferably of the type having magnetostrictive of piezoelectric elements, which may be carried by a vessel below the water line. The design characteristics of the transducer are such that the energy is projected therefrom in a relatively narrow conical beam.

When such a pulse of wave energy strikes an underwater target such as a submarine, it is reflected or echoed back to the transducer (which now acts as a receiver) to actuate a visual and/or aural indicator in the receiving apparatus. The operator by noting the bearing of the transducer at which an echo is received will know that a target lies somewhere along such bearing. Since the speed of supersonic wave energy in water is substantially constant, the range of such target may be calculated from the time required for the pulse of energy to reach the target and return to the transducer. The transducer is mounted for rotation and the operator is thus able to search the underwater area for a target such as an enemy submarine throughout a complete circle.

The type of transducer construction currently used for underwater echo ranging apparatus has a directivity pattern, the main lobe of which is relatively flat in the area of maximum sensitivity. Because of this, an operator often has considerable difficulty in finding the exact bearing at which the reflected pulse echo is received at maximum signal strength, such bearing representing the true bearing of the target relative to the transducer.

Hence the present technique employed by operators to obtain a target bearing is to train the transducer to the right until the echo is lost on that side of the target, then to the left until the echo is lost on the other side of the target. Noting the echo drop-off bearings for both right and left swings of the transducer, the correct bearing of the target is taken as the mean between the two.

The above operating procedure takes considerable time and is relatively inaccurate and it is the general object of this invention to provide a system in which the bearing of an underwater target may be accurately ascertained in a minimum of time and with improved accuracy.

In this improved system, intermittent pulses of compressional wave energy, preferably of supersonic frequency, are projected in beam form from the transducer as described above. In receiving the returning echo, however, the magnetostrictive or piezoelectric elements of the transducer (which is then acting as a receiver) are divided into two or more parts.

With the transducer elements split into two parts such as parts A and B, their electrical outputs, if combined directly, would give a directivity pattern of that of the two combined into a larger unit with a single sensitivity face. However, in the improved arrangement, the output from half A is shifted in phase and combined with the output from half B with no phase shift. The directivity pattern then corresponds approximately to the pattern which would be obtained were half A to be moved physically in space with relation to half B and the outputs of halves A and B combined directly. The result of introducing this phase shift is to shift the axis of the principal lobe of the overall directivity pattern from the perpendicular to the face of the transducer halves A and B. To state it in another manner, the result of introducing phase shift into one half is equivalent to rotating the active face of the transducer slightly in one direction from the bearing at which the energy pulse was projected from the transducer.

In a similar manner, the output from half B is shifted in phase and combined with the output from half A with no phase shift. The directivity pattern then corresponds approximately to the pattern which would be obtained were transducer half B moved physically in space from half A and the outputs from halves A and B combined directly. The result of introducing this latter phase shift is to shift the axis of the principal lobe of the overall directivity pattern in the opposite direction from the perpendicular to the face of the transducer.

Both sets of connections of the halves A and B can exist simultaneously and thus give the effect of two divergent directivity patterns which overlap each other. By comparing the combined amplitude of the outputs of half A shifted in phase and half B with that of half B shifted in phase and half A, an accurate measure of the angle from which the echo pulse is received can be obtained. If the pulse is coming from a direction perpendicular to the active face of the transducer, the amplitudes of the output signals in both output circuits will be the same. However, if the pulse is coming from a direction which is at an angle to the face of the transducer, the amplitude of the signal in one of the output circuits will be greater than the amplitude of the signal in the other circuit.

Thus, when an echo pulse from an underwater target is picked up on the transducer, the operator may continually ascertain very accurately the bearing of the target relative to the transducer by so training the transducer that the amplitudes of the signals in both output circuits are maintained at an equal level.

In the preferred embodiment, the respective amplitudes of the signals in the two output circuits are compared by obtaining their electrical difference and utilizing this latter quantity to effect a deflection of the beam spot on the screen of a cathode ray oscilloscope either to the right or left from the screen center, as the case may be. However, other means of comparison may be utilized.

A primary object of this invention is therefore to provide a novel system for ascertaining the bearing of an underwater target relative to a transducer by simultaneously establishing electrically a pair of overlapped direction sensitive patterns in the transducer elements and comparing the relative amplitudes of the signal strength of a received pulse in both patterns.

A more specific object is to provide a system for accurately ascertaining the bearing of an underwater target relative to a transducer by dividing the transducer elements vertically into two equal sections (equivalent then to two closely spaced separate transducers) to thereby provide two output channels, connecting a phase shifting network between the two channels so that an equal degree of phase shift may be introduced in each of the channels and then by combination to establish signal strengths in each of the channels which are equivalent to a simultaneous shift in the principal lobe of the directivity pattern of the transducer both left and right from the perpendicular to the face of the transducer, the shifted lobe patterns being overlapped, and comparing the amplitudes of the signal strengths in each of the output channels on a cathode ray oscilloscope.

Another object is to provide a system as described in the immediate preceding paragraph in which the signals in each of the output channels are converted to different frequencies and then transmitted simultaneously through a common amplifier channel to which the principle of time varied gain may be applied. This feature lowers the gain in both output channels equally for a brief period immediately following the projection of the pulse from the transducer in order that the signals in each of the channels caused by reverberation will not produce too great a deflection of the beam spot on the screen of the cathode ray tube thereby making it possible to leave the receiver gain high enough so that any spot deflection due to a direct echo stands out predominantly on the screen.

Yet another object of the invention is to provide a target detecting system of the class described wherein an operator may observe on an oscilloscope screen the compressional wave energy emitted from an underwater target such as the rotating propellers of a submarine.

These and other objects of the invention will become more apparent from the following detailed description when considered with the accompanying drawings in which:

Fig. 2 is a simplified diagram showing in block form the principal elements of the circuit in Fig. 1; and Fig. 3 is a view showing the two overlapped directivity patterns produced by the arrangement shown in Fig. 1.

Figure 1:
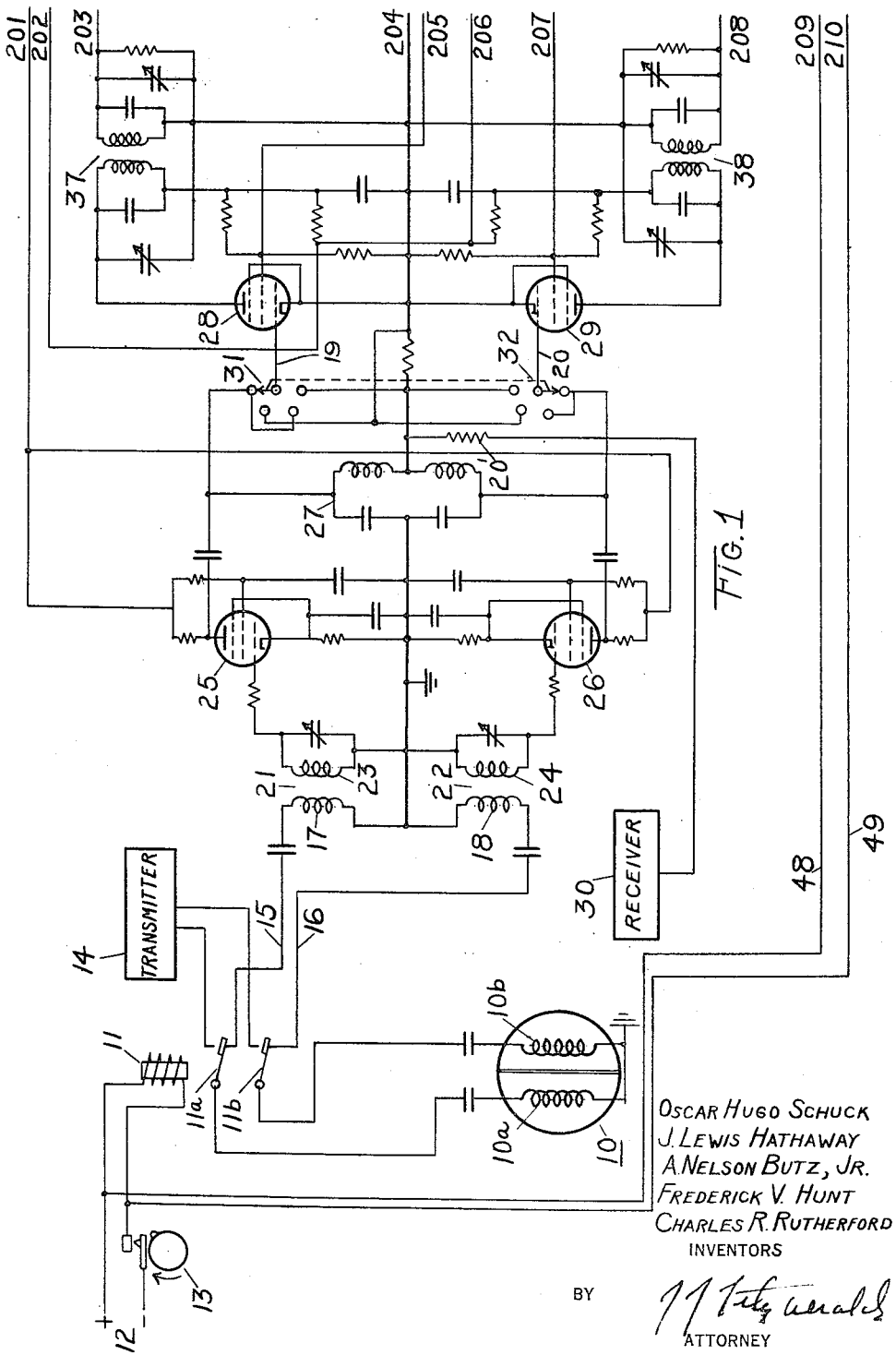
Fig. 1 is a schematic diagram showing the circuit arrangement of the elements used to accomplish the invention.
Figure 1:
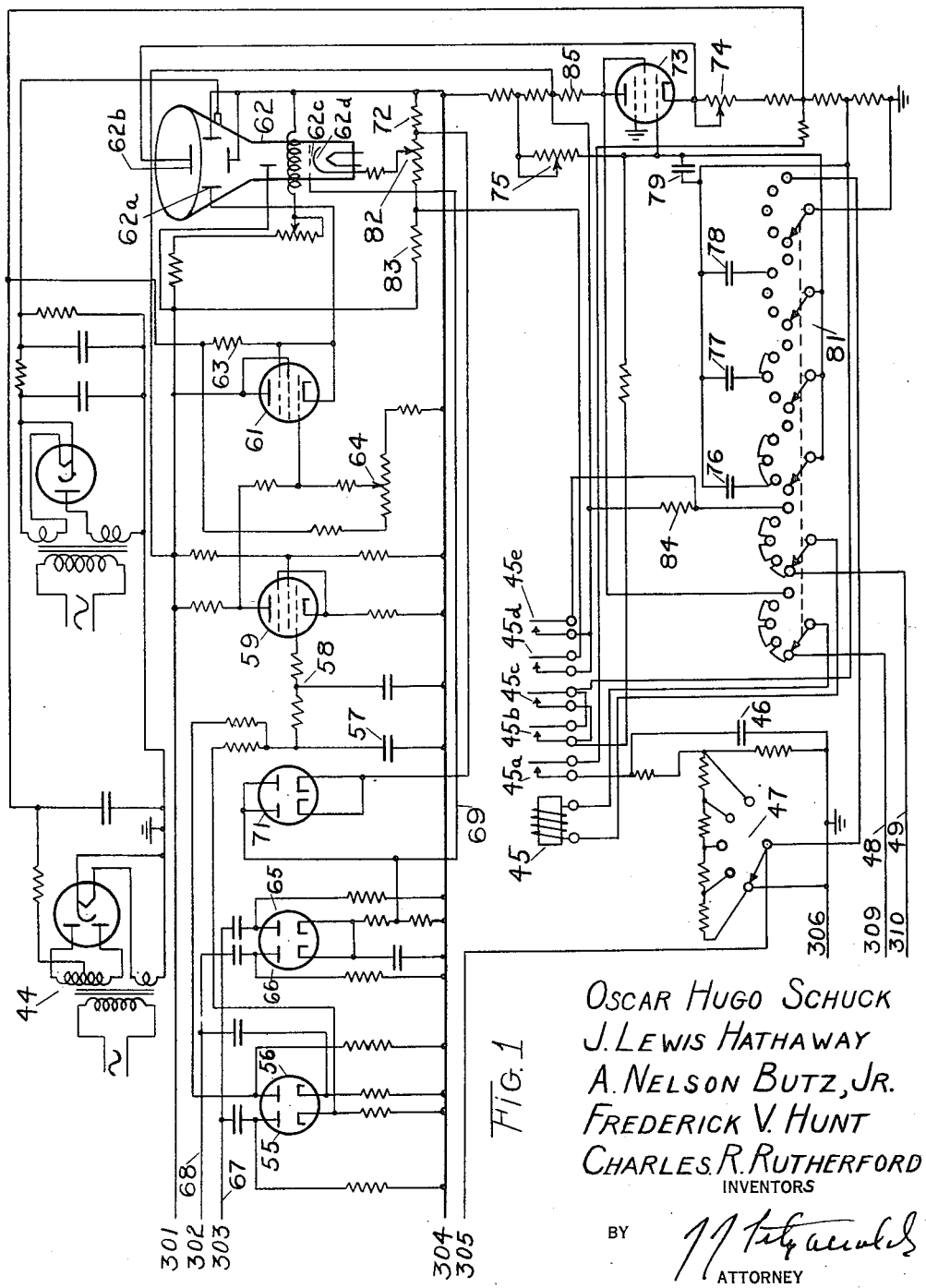

Referring now to the drawings which disclose a preferred form of the invention, a transducer is shown at 10. The transducer's active elements which may be either of the piezoelectric or magnetostrictive type are of conventional construction. The electrical connections from the elements comprising the left half 10a and those comprising the right half 10b are brought out separately.

A relay 11, the winding of which is energized intermittently from a power source 12 through timer contactor 13, functions when energized to momentarily connect the output at supersonic frequency from transmitter oscillator 14 through its contacts 11a, 11b to the transducer halves 10a and 10b. The electrical energy imparted to the transducer elements which is a pulse of very short duration causes a pulse of compressional wave energy to be projected through the water.

The dimensions of the transducer 10 relative to the frequency of the oscillator 14 are such that the pulse is projected normal to the active face of transducer 10 along axis Ox and its transmitting pattern has a major lobe such as pattern p in Fig. 3, with its maximum along axis Ox.

After the pulse of compressional wave energy is projected, contacts 11a and 11b of relay 11 move to connect the transducer halves 10a and 10b to separate output circuits 15 and 16.

Should the projected pulse strike an underwater target and be reflected, the pulse echo will return to the face of the transducer 10 and mechanically excited the transducer elements thereby generating electromotive forces therein. The voltage output from the elements in transducer half 10a feed into output circuit 15 and the output from the elements of transducer half 10b into circuit 16.

The output voltages in circuits 15 and 16 which should be equal, or nearly so, feed into the primary windings 17, 18 of input transformers 21, 22 which are similar and tuned to the frequency of the output voltages.

The voltages appearing across the secondary windings 23, 24 of transformers 21, 22, which are of equal amplitudes but which are in phase only for signals from the perpendicular to the projector face are impressed on the grids of isolating amplifiers 25, 26, respectively. The isolating amplifiers 25, 26 make it possible to work with transducers of widely varying impedance without the necessity of careful matching. These may however, be dispensed with if the transducer impedance is known and the remainder of the system properly designed.

Connected across the output circuits from amplifiers 25 and 26 is a phase shifting network 27 shown in the drawings as a lag line, the function of which is to delay the voltage output from one half of transducer 10 relative to that from the other half at the grid of mixer tubes 28 and 29. Lag line 27 may consist of one or more sections of constant K low pass filter, properly terminated, and designed to be operated at frequencies well below the cut-off frequency.

It will now be seen that the two halves 10a, 10b of transducer 10 are connected in parallel through tuning transformers 21, 22 and amplifiers 25, 26 to the mixers 28 and 29 respectively, with lag line 27 connected across the inputs to the grid circuits of the two mixers. Therefore, a channel 19 at mixer 28 receives unshifted signal from half 10a of transducer 10 and also receives a lagging signal from half 10b of transducer 10 via lag line 27. The resultant signal into mixer 28 corresponds to a directional receiving pattern $p'$ (in Fig. 3) the axis of the principal lobe of which is shifted from the perpendicular $Ox$ to axis $Oy$.

Similarly, the resultant input signal in channel 20 at mixer 29 corresponds to directional pattern $p''$, the axis of which is shifted to the other side of the perpendicular $Ox$ to axis $Oz$.

As is apparent in Fig. 3, the two mixers 28, 29 get equal signals for inputs along axis $Ox$, the intensity of such currents being equal to vector $Or$. But with an input from another direction such as along axis $Ow$, the intensity of the signal to mixer 28 (pattern $p'$) corresponds to the vector $Ot$ and the intensity of the signal to mixer 29 (pattern $p''$) corresponds to the vector $Os$. Accordingly the input to mixers 28, 29 will differ in intensity for input signals received along an axis like $Ow$ at one side of the perpendicular axis $Ox$.

The output from the mid point of lag line 27 is drawn alike from both halves 10a and 10b of transducer 10 and therefore corresponds to directional pattern $p$ in Fig. 3 with its axis $Ox$ perpendicular to the face of the transducer 10. Accordingly, an output from the mid point of lag line 27 may be connected through resistance 20' to an aural and/or visual receiver 30. Receiver 30 is of conventional design and therefore has been illustrated only in block form since its construction per se forms no part of this invention.

Connected between lag line 27 and mixer tubes 28, 29 are commonly operated input selector switches 31, 32, the functions of which will be later described.

In order to compare the intensities of the outputs from the transducer in the two channels 19 and 20, a cathode ray oscilloscope is utilized. Its connection in applicants' system will be described in detail hereinafter. Suffice to say here, however, it is well known that the cathode ray oscilloscope possesses a relatively small useful working range between excessive and insufficient deflection limits.

The lower limit may be determined by the focus or, if the focus is extremely good, by the distance from the screen of the oscilloscope to the operator. Too small a deflection of the cathode ray beam spot will produce too small an angular movement for proper definition in his visual system. Obviously, the upper useful limit is determined by the point where the beam spot is deflected beyond the edge of the tube screen.

While the working range of the cathode ray oscilloscope is therefore relatively small, the extremes of intensity level of the outputs in channels 19, 20 as encountered in practice, are large. It is, therefore, desirable to employ some sort of automatic volume control in the output amplifier system. Applicants have found that automatic volume control of the outputs operating as a function of time is preferable, this being known as time varied gain. Thus for pulse echoes from nearby objects, corresponding to short elapsed times, which echoes are at a comparatively high intensity level and are commonly referred to as reverberation, the gain will be low. The gain is allowed to rise, however, at a predetermined rate so that a greater gain will be available for the weaker, more distant pulse echoes returning from more distant objects such as enemy submarines.

However, with time varied gain as an accepted requirement, employment of it successfully requires its application equally to the two output channels 19, 20. It is, of course, possible to employ cut-off amplifier tubes of the same type and characteristics in the two channels and apply an equal amount of time varied gain control voltage simultaneously to each. If such tubes are well matched, the gains will drop by the same amount. If, however, such tubes do not have identical characteristics, a mismatch of gain in the two channels will result with corresponding incorrect indication of bearing of the target. In the present novel system, the problem of matching in the amplifier tubes in the two separate output channels is overcome by combining the outputs in the two channels in a common channel to which a time varied gain voltage is applied, thereby applying an equal amount of time varied gain to each of the outputs. The outputs in each of the channels 19 and 20 are combined into a common channel by converting the two outputs to different frequencies and then transmitting them simultaneously through a common channel amplifier.

For converting the outputs to different frequencies, a pair of oscillators 33, 34 (which are combined in one envelope) with commonly operated tank circuits 35, 36, are provided to feed mixers 28 and 29. The two oscillators are accurately tracked over their frequency range so that with a given echo signal frequency, mixer 28 will produce a 10 kc. beat frequency output in channel 19 while mixer 29 will produce a 7 kc. beat frequency output in channel 20. Thus with an echo frequency of 20 kc., oscillator 33 would be tuned to 30 kc. while oscillator 34 would be tuned to 27 kc.

All other frequencies including the echo signal frequency, the oscillator frequencies, sum frequencies and various harmonic combinations are eliminated in the output circuits of mixers 28, 29 by means of band pass filters 37 and 38 respectively.

The outputs from filters 37 and 38 are combined in a potentiometer 39 which acts as a balancing control and which should be adjusted to balance out any differences in gain in mixers 28, 29 and filters 37, 38 for a pulse received perpendicular to the face of transducer 10. This control feeds voltage to a main gain control 41, which may be, for example, a 12 step, 5 db. per step attenuator. The outputs from gain control 41 feed into a two stage common amplifier comprising tubes 42 and 43.

In order to reduce the gain in the output voltages in both output channels for a brief period immediately following the projection of a pulse from transducer 10 so that the output voltages produced by reverberation, as distinguished from a true echo, will not produce too great a deflection of the beam spot on the screen of the cathode ray tube, time varied gain is then applied to amplifiers 42 and 43 to control the gain of the latter as a function of time. That is, a "time varied gain" voltage is applied on the control grids of tubes 42 and 43 from a negative voltage power supply source 44 through contacts 45a of relay 45, condenser 46, and attenuator 47.

Relay 45 is energized through branch conductors 48, 49 (at the same time that relay 11 is energized) and when so energized, applies through contacts 45a, a high negative voltage thus charging condenser 46. The negatively charged condenser 46 puts a high negative voltage on the input grids of amplifiers 42 and 43, thereby greatly reducing their gain at and immediately after the pulse is projected from transducer 10. This negative charge on condenser 46 gradually leaks off through attenuator 47, thereby gradually reducing the negative voltage on the input sides of amplifiers 42, 43, and gradually restoring the normal gain characteristics of these amplifiers.

The two voltage outputs at 10 kc. and 7 kc. from amplifier 43 feed into 10 kc. and 7 kc. band pass filters 51 and 52 respectively, the latter filters being duplicates of filters 37 and 38. Filters 51, 52 function to separate out the 10 kc. and 7 kc. outputs so that they may be compared in the succeeding rectifier circuit.

Following the filters 51 and 52, the outputs are amplified once again by amplifiers 53, 54, the two amplifiers being contained within a single envelope, and then passed oppositely through rectifiers 55, 56, also contained within a common envelope. Rectifiers 55 and 56 are connected in reverse polarity in such manner that when the amplifiers are delivering unequal output voltages, a D. C. potential is derived of either positive or negative polarity depending upon which of the amplifiers 53, 54 is delivering the greater voltage. This D. C. potential is impressed across the condenser 57 to charge the latter either positively or negatively as the case may be.

The D. C. output from condenser 57 is fed through a resistance capacity filtering network 58. This reduces serrations of received echo pulses. The filtered D. C. output is then impressed on the grid of a D. C. amplifier 59.

The output from amplifier 59 is coupled to the grid of a horizontal deflection amplifier 61, and a cathode ray oscilloscope 62 has its horizontal beam deflecting members 62a connected in the cathode circuit of amplifier 61. A high bucking negative voltage from supply source 44 is applied to this cathode circuit through resistance 63 and there is also an adjustable negative voltage connected to the input grid of amplifier 61 through a potentiometer 64. When the latter is properly adjusted, the beam spot of the cathode ray tube 62 will be centered on the tube screen, provided, of course, no D. C. potential from condenser 57 is applied to the grid of amplifier 59.

In order to prolong the life of the screen of tube 62 as well as present a trace of improved clarity, means are provided to maintain the brightness of the cathode ray beam spot at a very low intensity except when an echo pulse is fed through the system onto the horizontal deflecting plates 62a of tube 62. Such means include rectifiers 65, 66, connected via conductors 67, 68 to the 10 kc. and 7 kc. output channels 19 and 20 from the twin channel amplifiers 53 and 54 respectively. Accordingly, when an echo pulse comes through amplifiers 53 and 54, the resulting outputs from rectifiers 65 and 66 combine and the positive direct current therefrom is applied via conductor 69 to grid 62c of cathode ray tube 62 thus brightening the beam spot on the tube screen.

Further, to prevent excessive brightening of the beam spot, the same D. C. output from rectifiers 65 and 66 is also applied across a limiting diode 71 which is biased by the voltage drop across a resistance 72. Whenever the D. C. output from rectifiers 65, 66 rises high enough to overcome this bias, current will flow through diode 71 thereby greatly reducing the rate of any further rise of voltage on the cathode ray tube grid 62c.

The vertical sweep of the electron beam in tube 62 is controlled by a vertical deflection amplifier 73, the output of which is connected to the vertical deflection means 62b of tube 62. The vertical sweep of the beam spot is synchronized with pulse transmission from transducer 10 so that the beam spot will start its upward path at the instant that a pulse has been projected from transducer 10. This is effected in part through contacts on relay 45 which as previously explained is energized simultaneously with relay 11.

The ends of the vertical sweep are determined respectively by a range start potentiometer 74 in the cathode circuit of amplifier 73 and a range limit potentiometer 75 which is connected in the grid circuit of amplifier 73.

Thus when relay 45 is energized to close contacts 45b and 45c, condensers 76–79, inclusive, will be discharged quickly to remove positive voltage from the grid of amplifier 73. The effect is to reduce the current through the vertical deflection means 62b of tube 62 to a negative value of about 10 ma. and shift the electron beam down to its lowermost position as adjusted by the range start potentiometer 74. When the contacts of relay 45 reopen as the latter is deenergized, condensers 76–79, inclusive, will begin to charge again, placing a steadily increasing positive voltage on the grid of tube 73. The resulting steadily increasing current in the anode-cathode circuit of tube 73 flows through the vertical deflection means 62b of tube 62 and thereby shifts the electron beam vertically from the bottom to the top of the tube screen. The speed of this vertical motion of the beam for any given position of range switch 81, is determined by adjustment of the range limit potentiometer 75.

Also when relay 45 is energized, closure of relay contacts 45d applies a high positive voltage from source 80 directly to an intensity potentiometer 82 instead of indirectly through resistance 83. This makes the cathode 62d of tube 62 more positive than before, thereby reducing the tube current. The effect is to render invisible the beam spot of the tube 62 when a pulse is projected and as it returns from the upper end of its range to the lower end.

*Operation*

Summarizing, the operation of the principal elements in applicants' novel system is as follows: Let it be assumed that a pulse of compressional wave energy is emitted from transducer 10, the directivity pattern of which corresponds to the pattern $p$ in Fig. 3. If the pulse intercepts a target such as a submarine and is reflected back along axis $Ow$ in Fig. 3, separate outputs in channels 15 and 16 will be obtained.

The outputs in channels 15 and 16 after passing through input transformers 21, 22 and amplifiers 25, 26 are then combined through lag line 27 to produce two resultant outputs in channels 19 and 20, equivalent to a simultaneous shift of the normal directivity pattern $p$ to patterns $p'$ and $p''$, respectively. Thus for a pulse echo returning along axis $Ow$, the output level of the pulse echo at the input to mixer 28 will be equal to vector $Ot$ while that in channel 20 at the input to mixer 29 will be equal to vector $Os$.

Mixers 28 and 29 convert the outputs in channels 19 and 20 to produce 10 kc. and 7 kc. beat frequency outputs respectively. After passing through filters 37, 38 and balancing potentiometer 39, the two outputs pass together through gain control 41 and amplifiers 42, 43. At this point, time varied gain is applied to amplifiers 42, 43 and the outputs therefrom are then fed into filters 51, 52 which again divide the two outputs into separate channels. The outputs from filters 51 and 52 are amplified by amplifiers 53 and 54 respectively and then feed into comparison rectifiers 55 and 56 which, as previously explained, are connected in reverse polarity so that the outputs in the channels are subtracted electrically to produce a voltage at the input to amplifier 59. Following amplification, this voltage produces a horizontal deflection of the beam spot on the screen of tube 62 by means of horizontal deflecting means 62a.

As previously described, the beam spot on the screen of tube 62 begins to move vertically upward at the end of the pulse projected from transducer 10. Therefore, taking into consideration the factor of time varied gain, the pattern on the screen of tube 62 will appear similar to that shown in Fig. 2 wherein left and right deflection of the beam spot due to reverberation is shown at 86 and deflection to the right of the center due to the pulse echo is shown at 87. This indicates to the operator that the true bearing of the target is somewhere to the right of the perpendicular $Ox$ to the face of the transducer 10.

In a similar manner, should the echo pulse return along an axis on the other side of the perpendicular $Ox$, the beam spot on the screen of tube 62 would be deflected to the left from the center of the screen.

In order to obtain the exact bearing of the target relative to the transducer, the operator should rotate the transducer until no deflection of the beam spot due to an echo appears on the screen of the oscilloscope 62. As previously explained, this means that the intensities of the outputs received in both channels 19 and 20 at the inputs to mixers 28 and 29 are equal, corresponding to the vector $Or$ in Fig. 3, and hence that the echo pulse is returning to the face of the transducer along the same axis at which it was projected from the transducer, namely axis $Ox$. Under these conditions, the true bearing of the target relative to the transducer 10 is therefore the bearing which is coincident with the perpendicular to the face of the transducer.

The novel system which has been described may also be used for viewing on the screen of the cathode ray tube 62 the characteristics of any underwater compressional wave energy that may be emitted directly from a source as distinguished from an echo of a pulse projected from transducer 10. Such a source might be the wave energy produced by rotating propellers of a submarine.

In order to do this, the transmission of pulses from transducer 10 is stopped and range switch 31 thrown to its extreme right position. With switch 31 in this position, the winding of relay 45 is placed in series with a voltage dropping resistor 84, and this series combination is in parallel with resistor 85, both these parallel branches being in series in relation to the anode of amplifier 73. Condenser 79 charges slowly and builds down the negative voltage on the grid of amplifier 73. Accordingly the current through amplifier 73 and resistance 85 increases and the voltage drop across resistance 85 increases. At first this voltage drop is not sufficient to deflect enough current through the winding of relay 45 to pull in its relay contacts, but eventually these contacts close. The first effect of this is for contacts 45e to shunt out resistance 84, thereby giving a firm closure for all contacts of relay 45.

Until relay 45 closes, the increasing charge on condenser 79 causes the beam spot on the cathode ray tube 62 to move vertically upward. But when relay 45 closes, the effect is the same as its closure simultaneously with the projection of a pulse from transducer 10 as previously described. Accordingly, the beam spot in the cathode ray tube 62 will travel repeatedly over its vertical course from bottom to top jumping back from the top to the bottom each time. The compressional wave energy input to transducer 10 from the external source such as the submarine's rotating propellers are processed through the two separate channels in the same manner as an echo pulse and produce voltages on the horizontal deflecting means 62a of tube 62. The net result of this is that the beam spot is jogged both right and left as it travels upward producing a wavy track. The transducer 10 should be trained so that the jogs to the left and right are of about equal amplitude, this position indicating that the transducer 10 is on the exact bearing of the submarine.

The input selector switches 31 and 32 have four positions and are ganged for contra-rotation. Reading counterclockwise on switch 31, the top position of this switch and the bottom position of switch 32 provide for normal operation of the system in which the two overlapping directivity lobe patterns of the transducer 10 are established. The next two positions give patterns as seen by either the left-steered or right-steered lobes $p'$ and $p''$, and the bottom position of switch 31 (hence the top position of 32) is a test position for checking overall balance and adjustment of the two amplifier channels.

In conclusion, it is desired to point out that while the foregoing drawings represent preferred embodiments of the invention, still other changes may be made therein without departing from the spirit and scope of this invention as expressed by the appended claims. For example, the phase shifting introduced into the two sections of the transducer has been described as a lag network which retards the phase of the electrical quantities produced therein. However, since all that is needed is a relative shift in phase between the outputs of the two transducer sections, it is evident that a lead network to advance the phase of the electrical quantities produced in either section of the transducer or a combination of lead and lag sections will work equally as well.

Further while it is preferred to use a single tranducer structure in which the elements are divided into two equal sections, it is evident that substantially the same result may be obtained with the use of two separate transducers provided they are placed close enough to each other so that overlapping directivity lobe patterns may be created.

While the invention has been described as applied to underwater target detecting apparatus utilizing compressional wave energy, it is to be understood that it is equally applicable in conjunction with above-surface target detectors, and other forms of wave energy. As used herein, the term "transducer" is intended to include any device capable of translating wave energy, either sonic or radiant to electrical energy and vice versa.

We claim:

1. Apparatus for determining the direction of a source of wave energy comprising a pair of transducers disposed closely adjacent each other and having their active faces coplanar, an output circuit for each transducer, phase shifting means connected in each output circuit, means combining a phase shifted output in each of said output circuits with an unshifted output from each of the other of said output circuits to produce two resultant outputs, means to modulate each resultant output at a different frequency, means combining said resultant outputs into a common channel, and means for comparing the amplitudes of said resultant outputs.

2. Apparatus for determining the direction of a source of wave energy comprising a pair of transducers disposed closely adjacent each other and having their active faces coplanar, an output circuit for each transducer, phase shifting means connected in each output circuit, means combining a phase shifted output in each of said output circuits with an unshifted output from each of the other of said output circuits to produce two resultant outputs, means combining said resultant outputs into a common channel, and means for comparing the amplitudes of said resultant outputs.

3. Apparatus for determining the direction of a source of wave energy comprising a pair of transducers disposed with their active faces coplanar, an output channel for each transducer, phase shifting means connected across said output channels whereby a phase shifted output from one of said output channels will combine with an unshifted phase output from the other of said output channels to produce a resultant output in each channel, means combining said resultant outputs into a common channel, means applying a time varied gain to said resultant outputs when in said common channel, and means for then comparing the amplitudes of said resultant outputs.

4. Apparatus for determining the direction of a source of wave energy comprising a pair of transducers disposed closely adjacent each other and having their active faces coplanar, an output channel from each transducer, phase shifting means connected across said output channels whereby a phase shifted output from one of said output channels will combine with an unshifted phase output from the other of said output channels to produce a resultant output in each channel, means combining said resultant outputs into a common channel, means applying a time varied gain to said resultant outputs in said common channel, means for then obtaining the electrical difference between said resultant outputs, a cathode ray tube, a sweep circuit for the cathode ray beam thereof, and means for applying said resultant output difference to deflect said beam from its sweep path.

5. Apparatus for determining the direction of a source of wave energy comprising a pair of transducers disposed with their active faces coplanar, an output channel for each transducer, phase shifting means connected across said output channels whereby a phase shifted output from one of said output channels will combine with an unshifted phase output from the other of said output channels to produce a resultant output in each channel, means combining said resultant outputs into a common channel, means applying a time varied gain to said resultant outputs when in said common channel, means then dividing said resultant outputs into separate channels, a rectifier connected to each of last said channels, means for obtaining the electrical difference between the outputs of said rectifiers, a cathode ray oscilloscope, means for initiating a sweep of the ray beam in said oscilloscope, and means applying said rectifier output difference to deflect said beam from its sweep path.

6. Apparatus for determining the direction of a source of wave energy comprising a pair of transducers disposed closely adjacent each other and having their active faces coplanar, an output circuit for each transducer, phase shifting means connected in each output circuit, means combining a phase shifted output in each of said output circuits with an unshifted output from each of the other of said output circuits to produce two resultant outputs, means combining said resultant outputs into a common channel, means applying a time varied gain to said resultant outputs when in said common channel, means then dividing said resultant outputs into separate channels, means for then obtaining the electrical difference between said resultant outputs, a cathode ray tube, a sweep circuit for the cathode ray beam thereof and means for applying said resultant output difference to deflect said beam from its sweep path.

7. Apparatus for determining the direction of a source of wave energy comprising a pair of transducers disposed with their active faces coplanar, an output channel for each transducer, phase shifting means connected to said output channels, a mixer for each channel, means providing each said mixer with a phase shifted output from one of said output channels and an unshifted output from the other of said output channels, means combining the outputs from said mixers into a common channel amplifier, means applying a time varied gain to said outputs in said common channel amplifier, and means for comparing the amplitudes of said last outputs.

8. Apparatus for determining the direction of a source of wave energy comprising a pair of transducers disposed with their active faces coplanar, an output channel for each transducer, phase shifting means connected to said output channels, a mixer for each channel, means providing each said mixer with a phase shifted output from one of said output channels and an unshifted output from the other of said output channels, means combining the outputs from said mixers into a common channel amplifier, means applying a time varied gain to said outputs in said common channel amplifier, means then dividing said outputs into separate channels, a rectifier connected to each of said last channels, and means for comparing the outputs of said rectifiers.

9. Apparatus for determining the direction of a source of wave energy comprising first and second similar transducers disposed closely adjacent each other and having their active faces coplanar, the directivity pattern of said transducers when combined directly having substantially a major lobe the axis of which is perpendicular to the transducer faces, an output circuit for each transducer, phase shifting means connected across said output circuits whereby a phase shifted output from each one of said output circuits will combine with an unshifted phase output from each of the other of said output circuits to produce two resultant outputs corresponding to a simultaneous shift in the axis of said lobe to both sides of said perpendicular axis, said lobes being overlapped, means combining said resultant outputs into a common channel, means for applying time varied gain to said resultant outputs when in said common channel, and means for then comparing the amplitudes of said resultant outputs.

10. Apparatus for determining the direction of a source of wave energy comprising first and second similar transducers disposed closely adjacent each other and having their active faces coplanar, the directivity pattern of said transducers when combined directly having substantially a major lobe the axis of which is perpendicular to the transducer faces, an output circuit for each transducer, phase shifting means connected across said output circuits whereby a phase shifted output from each one of said output circuits will combine with an unshifted phase output from each of the other of said output circuits to produce two resultant outputs corresponding to a simultaneous shift in the axis of said lobe to both sides of said perpendicular axis, said lobes being overlapped, means including frequency changing means for converting said resultant outputs to outputs of different frequencies, means then combining said last outputs into a common channel, means for applying time varied gain to said outputs when in said common channel, means then dividing said outputs into separate channels, and means for then comparing the amplitudes of the outputs in said separate channels.

11. Apparatus for determining the direction of a source of wave energy comprising a pair of transducers disposed with their active faces coplanar, an output channel for each transducer, phase shifting means connected to said output channels, a mixer for each channel, means providing each said mixer with a phase shifted output from one of said output channels and an unshifted output from the other of said output channels, means combining the outputs from said mixers into a common channel amplifier, means applying a time varied gain to said outputs in said common channel amplifier, means then dividing said outputs into separate channels, a rectifier connected to each of said last channels, means for obtaining the electrical difference between the outputs of said rectifiers, a cathode ray oscilloscope, and means applying said output difference to the ray deflecting means in said oscilloscope.

12. Apparatus for determining the direction of a source of wave energy comprising a pair of transducers disposed closely adjacent each other and having their active faces coplanar, a transmitter oscillator, relay means for alternately connecting the output of said oscillator to said transducers and said transducers to separate output channels therefrom, phase shifting means connected in each output channel, means combining a phase shifted output in each of said output channels with an unshifted output from each of the other of said output channels to produce two resultant outputs, means combining said resultant outputs into a common channel, means applying a time varied gain to said resultant outputs when in said common channel, means for then obtaining the difference between said resultant outputs, a cathode ray oscilloscope, means synchronized with the operation of said relay means to initiate a sweep of the ray beam in said oscilloscope, and means applying said resultant output difference to deflect said beam from its sweep path.

13. Apparatus for determining the direction of a source of wave energy comprising a pair of transducers disposed closely adjacent each other and having their active faces coplanar, a transmitter oscillator, first relay means for alternately connecting the output of said oscillator to said transducers and said transducers to separate output channels therefrom, phase shifting means connected in each output channel, means combining a phase shifted output in each of said output channels with an unshifted output from each of the other of said output channels to produce two resultant outputs, means for obtaining the difference between said resultant outputs, a cathode ray oscilloscope, second relay means synchronized with the operation of said first relay means to initiate a sweep of the ray beam in said oscilloscope, means applying said resultant output difference to deflect said beam from its sweep path, and switch means operable to disconnect said second relay means from operation synchronously with said first relay means and to connect said second relay means to produce automatically recurring sweeps of said beam whereby said apparatus is conditioned for receiving wave energy directly from a remote source when said transmitter oscillator is not in use.

14. Apparatus for determining the direction of a source of wave energy comprising a pair of transducers disposed closely adjacent each other and having their active faces coplanar, a transmitter oscillator, relay means for alternately connecting the output of said oscillator to said transducers and said transducers to separate output channels therefrom, phase shifting means connected across said output channels whereby a phase shifted output from one of said output channels will combine with an unshifted phase output from the other of said output channels to produce a resultant output in each channel, means combining said resultant outputs into a common channel, means applying a time varied gain to said resultant outputs when in said common channel, means for obtaining the difference between said resultant outputs, a cathode ray oscilloscope, means synchronized with the operation of said relay means to initiate a sweep of the ray beam in said oscilloscope, and means applying said resultant output difference to deflect said beam from its sweep path.

15. Apparatus for determining the direction of a source of wave energy comprising a pair of transducers disposed closely adjacent each other and having their active faces coplanar, a transmitter oscillator, relay means for alternately connecting the output of said oscillator to said transducers and said transducers to separate output channels therefrom, phase shifting means connected across said output channels whereby a phase shifted output from one of said output channels will combine with an unshifted phase output from the other of said output channels to produce a resultant output in each channel, means for obtaining the electrical difference between said resultant outputs, a cathode ray oscilloscope, means synchronized with the operation of said relay means to initiate a sweep of the ray beam in said oscilloscope, and means for applying said resultant output difference to deflect said beam from its sweep path.

16. Apparatus for determining the direction of a source of wave energy comprising a pair of transducers disposed closely adjacent each other and having their active faces coplanar, a transmitter oscillator, relay means for alternately connecting the output of said oscillator to said transducers and said transducers to separate output channels therefrom, phase shifting means connected to said output channels, a mixer for each channel, means providing each said mixer with a phase shifted output from one of said output channels and an unshifted output from the other of said output channels, means combining the outputs from said mixers into a common channel amplifier, means applying time varied gain to said common channel amplifier, means then dividing said mixer outputs into separate channels, a rectifier connected to each of last said channels, means for obtaining the electrical difference between the outputs of said rectifiers, a cathode ray oscilloscope, means synchronized with the operation of said relay means to initiate a sweep of the ray beam in said oscilloscope, and means applying said rectifier output difference to deflect said beam from its sweep path.

17. Apparatus for determining the direction of a source of wave energy comprising first and second similar transducers disposed closely adjacent each other and having their active faces coplanar, the directivity pattern of said transducers when combined directly having substantially a major lobe the axis of which is perpendicular to the transducer faces, a transmitter oscillator, relay means for alternately connecting the output of said transmitter oscillator to said transducers to emit a wave pulse and said transducers to separate output circuits therefrom, phase shifting means connected across said output circuits whereby a phase shifted output from each one of said output circuits will combine with an unshifted phase output from each of the other of said output circuits to produce two resultant outputs corresponding to a simultaneous shift in the axis of said lobe to both sides of said perpendicular axis, said lobes being overlapped, means including mixer means for combining said resultant outputs into a common channel, means synchronized with said relay means for applying time varied gain to said resultant outputs when in said common channel, means then dividing said resultant outputs into separate channels, means then deriving a voltage variable as the difference in the amplitudes of said resultant outputs, a cathode ray oscilloscope, means synchronized with said relay means to initiate a sweep of the ray beam in said oscilloscope and means for applying said variable voltage to deflect said beam from its sweep path when the echo of said transmitted wave pulse returns to the faces of said tranducers at any angle other than a perpendicular thereto.

18. Apparatus for determining the direction of a source of wave energy comprising a pair of juxtapositioned transducers disposed with their active faces coplanar, an output channel for each transducer, a single phase shifting means connected across said output channels whereby a phase shifted output from one of said output channels will combine with an unshifted phase output from the other of said output channels to produce a resultant output in each channel, means combining said resultant outputs into a common channel, means applying a variable gain to said resultant outputs when in said common channel, and means for then comparing the amplitudes of said resultant outputs.

19. Apparatus for determining the direction of a source of wave energy comprising a pair of juxtapositioned transducers disposed with their active faces coplanar, an output channel for each transducer, a single phase shifting means connected across said output channels whereby a phase shifted output from one of said output channels will combine with an unshifted phase output from the other of said output channels to produce a resultant output in each channel, means combining said resultant outputs into a common channel, means applying a variable gain to said resultant outputs when in said common channel, and means including a cathode ray oscilloscope for then comparing the amplitudes of said resultant outputs.

20. Apparatus for determining the direction of a source of wave energy comprising a pair of juxtapositioned transducers disposed with their active faces coplanar, an output channel for each transducer, a single phase shifting means connected across said output channels whereby a phase shifted output from one of said output channels will combine with an unshifted phase output from the other of said output channels to produce a resultant output in each channel, means combining said resultant outputs into a common channel, means applying a variable gain to said resultant outputs when in said common channel, means then dividing said resultant outputs into separate channels, and means for comparing the amplitudes of the separated resultant outputs.

21. Apparatus for determining the direction of a source of wave energy comprising first and second similar transducers disposed closely adjacent each other and having their active faces coplanar, the directivity pattern of said transducers when combined directly having substantially a major lobe the axis of which is perpendicular to the transducer faces, a transmitter oscillator, relay means for alternately connecting the output of said transmitter oscillator to said transducers to emit a wave pulse and said transducers to separate output circuits therefrom, phase shifting means connected across said output circuits whereby a phase shifted output from each one of said output circuits will combine with an unshifted phase output from each of the other of said output circuits to produce two resultant outputs corresponding to a simultaneous shift in the axis of said major lobe to both sides of said perpendicular axis to form two partially overlapped lobes, means including mixer means for combining said resultant outputs into a common channel and means for comparing the amplitudes of said resultant outputs.

22. Apparatus for determining the direction of a source of wave energy comprising first and second similar transducers in juxtaposition and having their active faces coplanar, the directivity pattern of said transducers when combined directly having substantially a major lobe the axis of which is perpendicular to the transducer faces, means for alternately directly combining and energizing said transducers to emit a wave pulse having said major lobe directivity pattern or connecting said transducers to separate output circuits therefrom, phase shifting means connected across said output circuits whereby a phase shifted output from each one of said output circuits will combine with an unshifted phase output from each of the other of said output circuits to produce two resultant outputs corresponding to a simultaneous shift in the axis of said major lobe to both sides of said perpendicular axis to form two partially overlapped lobes, means including mixer means for combining said resultant outputs into a common channel, and means for comparing the amplitudes of said resultant outputs.

23. Apparatus for determining the direction of a source of wave energy comprising a pair of juxtaposed transducers having their active faces coplanar, an output channel for each transducer, phase shifting means connected across said output channels whereby a phase shifted output from one of said output channels will combine with an unshifted phase output from the other of said output channels to produce a resultant output in each channel, means for modulating the resultant output in each channel at a different frequency, means combining said modulated resultant outputs into a common channel, means for variably amplifying said modulated resultant outputs while in said common channel, means for filtering said amplified resultant outputs into separate channels, and means for comparing the amplitudes of the separated resultant outputs.

24. Apparatus for determining the direction of a source of wave energy comprising a transducer having an active face composed of only two sections, a single phase shifting means associated with both of said transducer sections, means for combining a phase shifted output from one transducer section with an unshifted output from the other transducer section to produce a first output quantity corresponding to a first direction sensitive lobe pattern of said transducer, and means for similarly and simultaneously producing a second output quantity corresponding to a second direction sensitive lobe pattern of said transducer different from said first lobe pattern, said lobe patterns being partially overlapped.

25. Apparatus for determining the direction of a source of wave energy comprising a transducer having an active face composed of only two sections, a single phase shifting means associated with both of said transducer sections, means for combining a phase shifted output from one transducer section with an unshifted output from the other transducer section to produce a first output quantity corresponding to a first direction sensitive lobe pattern of said transducer, and means for simultaneously combining a phase shifted output from said other transducer section with an unshifted output from said one transducer section to produce a second output quantity corresponding to a second direction sensitive lobe pattern of said transducer different from said first lobe pattern and partially overlapped therewith.

26. Apparatus for determining the direction of a source of wave energy comprising a transducer having an active face composed of only two sections which have a direction sensitive lobe pattern the axis of which is normally perpendicular to the active face of said transducer, a single phase shifting means associated with both of said transducer sections, means for combining a phase shifted output from one transducer section with an unshifted output from the other transducer section to produce a first output quantity corresponding to a shift in the axis of said pattern to one side of said perpendicular, and means for similarly and simultaneously producing a second output quantity corresponding to a shift in the axis of said pattern to the other side of said perpendicular, said shifted patterns being partially overlapped.

27. Apparatus for determining the direction of a source of wave energy comprising a pair of transducers disposed closely adjacent each other and having their active faces coplanar, an output circuit for each transducer, phase shifting means connected in each output circuit, means combining a phase shifted output in each of said output circuits with an unshifted output from each of the other of said output circuits to produce several resultant outputs, means for modulating and then combining said resultant outputs into a common channel, means applying a time varied gain to said resultant outputs when in said common channel, and means for then comparing the amplitudes of said resultant outputs.

28. Apparatus for determining the direction of a source of wave energy comprising a pair of transducers disposed with their active faces coplanar, an output channel for each transducer, phase shifting means connected across said output channels whereby a phase shifted output from one of said output channels will combine with an unshifted phase output from the other of said output channels to produce a resultant output in each channel, means for modulating and then combining said resultant outputs into a common channel, means applying a time varied gain to said resultant outputs when in said common channel, and means for comparing the amplitudes of said resultant outputs.

29. Apparatus for determining the direction of a source of wave energy comprising a pair of transducers disposed with their active faces coplanar, an output channel for each transducer, phase shifting means connected to said output channels, a mixer for each channel, means providing each said mixer with a phase shifted output from one of said output channels and an unshifted output from the other of said output channels, means for modulating the output of said mixers, means combining the outputs from said mixers into a common channel amplifier, means applying a time varied gain to said outputs in said common channel amplifier, and means for comparing the amplitudes of last said outputs.

30. Apparatus for determining the direction of a source of wave energy comprising a pair of transducers disposed with their active faces coplanar, an output channel for each transducer, phase shifting means connected to said output channels, a mixer for each channel, means providing each said mixer with a phase shifted output from one of said output channels and an unshifted output from the other of said output channels, means for modulating the output of said mixers, means combining the outputs from said mixers into a common channel amplifier, means applying a time varied gain to said outputs in said common channel amplifier, means whose output polarity is determined by the relative intensity of said outputs and whose output amplitude is proportional to said relative intensity, means for pictorially viewing the polarity and amplitude.

31. Apparatus for determining the direction of a source of wave energy comprising a pair of transducers disposed closely adjacent each other and having their active faces coplanar, a transmitter oscillator, relay means for alternately connecting the output of said oscillator to said transducers and said transducers to separate output channels therefrom, phase shifting means connected in each output channel, means combining a phase shifted output in each of said output channels with an unshifted output from each of the other of said output channels to produce two resultant outputs, means for modulating the resultant outputs, means combining said resulting outputs into a common channel, means applying a time varied gain to said resultant outputs when in said common channel, means for then obtaining the difference between said resultant outputs, a cathode ray oscilloscope, means synchronized with the operation of said relay means to initiate a sweep of the ray beam in said oscilloscope, and means applying said resultant output difference to deflect said beam from its sweep path.

32. Apparatus for determining the direction of a source of wave energy comprising a pair of transducers disposed closely adjacent each other and having their active faces coplanar, a transmitter oscillator, relay means for alternately connecting the output of said oscillator to said transducers and said transducers to separate tuned output channels therefrom, phase shifting means connected to said output channels, a mixer for each channel, means providing each said mixer with a phase shifted output from one of said output channels and an unshifted output from the other of said output channels, means for modulating and combining the outputs from said mixers into a common channel amplifier, means applying time varied gain to said common channel amplifier, a rectifier connected to the common channel and a rectifier connected to one modulating means for blocking out one modulation, means for obtaining the electrical difference between the outputs of said mixers in said common channel, a cathode ray oscilloscope, means synchronized with the operation of said relay means to initiate a sweep of the ray beam in said oscilloscope, and means applying said rectifier output difference to deflect said beam from its sweep path.

FREDERICK V. HUNT.
OSCAR HUGO SCHUCK.
CHARLES R. RUTHERFORD.
J. LEWIS HATHAWAY.
A. NELSON BUTZ, Jr.

References Cited in the file of this patent

UNITED STATES PATENTS

| Number | Name | Date |
|---|---|---|
| 2,143,035 | Smith | Jan. 10, 1939 |
| 2,166,991 | Guanella | July 25, 1939 |
| 2,167,492 | Sproule | July 25, 1939 |
| 2,213,273 | Earp | Sept. 3, 1940 |
| 2,213,874 | Wagstaffe | Sept. 3, 1940 |
| 2,251,708 | Hefele | Aug. 5, 1941 |
| 2,282,402 | Hefele | May 12, 1942 |
| 2,355,502 | Barton | Aug. 8, 1944 |
| 2,467,368 | Batchelder | Apr. 19, 1949 |